Patented May 26, 1953

2,640,066

UNITED STATES PATENT OFFICE 2,640,066

ORGANO SILICON COMPOUNDS AND THEIR PREPARATION

Charles F. Kohl, Jr., Pittsburgh, Pa., assignor to Corning Glass Works, Corning, N. Y., a corporation of New York No Drawing. Application November 17, 1947, Serial No. 786,541

5 Claims. (Cl. 260—448.2)

The present invention relates to a new class of organosilanes and to methods for their preparation.

In general in the organosilicon art the organic radicals which are linked to silicon are monovalent hydrocarbon radicals. U. S. Patent 2,258,219 describes the preparation of chlorophenylsilicon chlorides and fluorophenylsilicon chlorides. The hydrolyzates of these silanes are readily condensible similarly to silanes which do not contain halogen substituents in the organic radicals.

Objects of the present invention are to provide methods for the preparation of silanes, the hydrolyzates of which are relatively quite stable in comparison to the heretofore known organosilanols.

In accordance herewith a Grignard reagent is prepared by reacting a trifluoromethyl substituted bromobenzene with magnesium at a temperature below 80° C. The Grignard reagent so produced is reacted with a silicon chloride which contains at least two chlorine atoms per silicon whereby at least one trifluoromethyl substituted phenyl radical is bonded to the silicon of the silicon chloride. The coupling of the Grignard reagent with the silicon chloride is effected at a temperature below 80° C.

The preparation of fluoromethyl substituted phenyl bromide by the bromination of trifluoromethylbenzenes has been described by Simons & Ramler in 1943 in the Journal of the American Chemical Society, volume 65, page 389. In accordance with this method the bromination is effected in liquid phase at 60° C. They indicated that the compounds obtained were exclusively those in which the bromine was in meta position. Bromination of these compounds can also be obtained by passing a mixture of the fluoro hydrocarbon and bromine in vapor phase through a reactor at a temperature in the range of 700 to 900° C. By this method the ortho compounds can be obtained as well as the meta compounds, together with small amounts of the para derivative.

One suitable compound for the preparation of the bromide is trifluoromethylbenzene. Other bromides may be prepared from the bis(trifluoromethyl)benzenes such as the compounds of this type in which the two trifluoromethyl radicals are in the 1,3 and 1,4 positions.

The Grignard reagents are produced by reacting the bromides as above described with magnesium. It should be noted that great care should be employed in the preparation and handling of these Grignard reagents inasmuch as violent explosions may occur, particularly if the temperature limit herein stated is exceeded. In the reaction of these bromides with the magnesium, the temperature should be held below 80° C. It is also of assistance in preventing detonation of these materials to operate in the presence of a solvent such as ether, or a low boiling hydrocarbon. The chlorine analogues of the above bromides do not appear to form Grignard reagents under the conditions stated.

The Grignard reagents so produced are then reacted with silicon chloride which contains at least two chlorine atoms bonded to each silicon atom. Suitable silicon chlorides include silicon tetrachloride and alkyl silicon chlorides, such as methyl silicon trichloride and dimethyl silicon dichloride. The silicon chloride is mixed with the Grignard reagent and maintained at below 80° C. The coupling reaction proceeds with relative ease.

In making the coupling, the silicon chloride is employed in amount at least equivalent to the amount of Grignard reagent employed. Preferably less than ten equivalents of the silicon chloride are present per equivalent of the Grignard reagent.

The products of the coupling reaction are of the type:

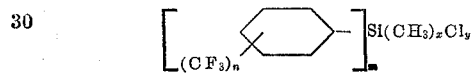

where $n$ is a positive integer less than three, $m$ and $y$ are positive integers less than four, $x$ is an integer from 0 to 2 inclusive, and $m+x+y=4$.

The outstanding characteristic of these silanes is that the silanols produced upon hydrolysis thereof do not condense readily as is customary with silanols. Some condensation can be effected with materials in which there is but one trifluoromethyl group on the phenyl radical. It has been impossible however, to effect polymerization of the condensed material by methods generally applicable for the polymerization of siloxanes. When two trifluoromethyl groups are linked to the phenyl radicals, the silanols are non-condensible except that a slight condensation can be effected with the hydrolyzate of bis(trifluoromethyl)phenyl trichlorosilane. It has been found that the products of hydrolysis are useful for such purposes as interacting with polydimethylsiloxanes whereby the siloxane is stabilized and for the preparation of copolymers with other siloxane units.

The following examples illustrate the present invention:

*Example 1*

Trifluoromethylphenyl bromide was reacted with an equivalent amount of metallic magnesium in the presence of 500 cc. of diethyl ether per 225 gms. of the bromide. The Grignard reagent so produced was added to five equivalents of silicon tetrachloride per equivalent of the Grignard reagent. The temperature was maintained at 50° C. for 24 hours. The magnesium halide salt which was precipitated was separated from the ethereal solution. The solution was distilled and the following products were recovered.

|  | B. P., ° C. | $D_{25}$ | $n_{D_{25}}$ |
|---|---|---|---|
| (1) $F_3CC_6H_4SiCl_3$ | 108 @ 47.4 mm | | 1.4678 |
| (2) $(F_3CC_6H_4)_2SiCl_2$ | 124.7 @ 3.4 mm | 1.4274 | 1.4884 |
| (3) $(F_3CC_6H_4)_3SiCl$ | 154.2 @ 0.7 mm | | 1.5018 |

Each of these compounds was hydrolyzed and the respective silanols were thereby obtained. Compound 1 was hydrolyzed by pouring it into water which contained an excess of sodium hydroxide. The triol so formed was soluble in the aqueous phase. This was precipitated by acidification of the residual alkali. Some slight condensation had occurred at this point. Further condensation can be effected by heating at 150° C. A solid resin is obtained which it is impossible to condense to the point that it becomes insoluble in hydrocarbon solvents. Compound 2 was similarly hydrolyzed and the crystalline diol was obtained. This may be copolymerized with dimethylsiloxane. When the diol is condensed alone, very thermally stable fluids are obtained which are only slightly volatile. Thus, this fluid has been employed as a coating over molten lead to prevent oxidation. While there was some loss of the fluid due to vaporization at this high temperature, the residual siloxane was still a mobile fluid after 1000 hours exposure to air under these conditions. Compound 3 upon hydrolysis produced a silanol of exceptional stability. Compound 1 was converted to the trifluoromethylphenylsilicon trifluoride by reacting the chloride with antimony trifluoride. When this compound was hydrolyzed by the method described in connection with the chloride a stable oil was produced. Compound 1 was heated for one hour with fuming sulphuric acid. This resulted in the removal of only 20% of the trifluoromethyl radicals, whereas this treatment removes all the phenyl radicals from phenyltrichlorosilane.

By reducing the amount of $SiCl_4$ with which the Grignard reagent was reacted to 1.5 equivalents of $SiCl_4$ per equivalent of the Grignard reagent, the ratios of compounds 2 and 3 to compound 1 were increased. Compounds 2 and 3 were cohydrolyzed by refluxing a mixture thereof with an excess of 5% aqua ammonia. The hydrolyzate condensed to give a product of the formula $$R_3SiOSiR_2OSiR_3$$

where R represents $F_3CC_6H_4$. This is a very stable material boiling at 240° C. at one mm., and at about 550° C. at atmospheric pressure. This is, accordingly, an excellent material for an indirect heat exchange medium for operation either at its boiling point or therebelow. It has a density of 1.4084 at 26° C. and an index of refraction of 1.4948 at 25° C.

*Example 2*

A mixture of bis 1,3(trifluoromethyl)benzene and bis 1,4-trifluoromethyl)benzene was brominated by passing it in vapor phase together with bromine through a tube heated to 800° C. The following compounds were obtained by this bromination:

(4) 5,bis 1,3(trifluoromethyl)phenyl bromide
(5) 6,bis 1,4(trifluoromethyl)phenyl bromide These bromides are readily separable by distillation.

The Grignards of each of compounds 4 and 5 were prepared by the method described in Example 1, following which the Grignard reagents were reacted with silicon tetrachloride. From the reaction involving compound 4 the following products were obtained:

|  | B. P., ° C. | $D_{20}$ | $n_{D_{20}}$ |
|---|---|---|---|
| (6) 5,bis 1,3(trifluoromethyl)phenyltrichlorosilane | 55–57.2 @ 1.7 mm | 1.532 | 1.4322 |
| (7) bis 5,5' [bis 1,3(trifluoromethyl)phenyl] dichlorosilane | 116.6 @ 2.4 mm | 1.567 | 1.4424 |
| (8) tris 5,5',5" [bis 1,3(trifluoromethyl)phenyl] chlorosilane | 156 @ 1.8–2.3 mm | 1.552 | 1.4445 |

Compound 6 is a low viscosity fluid. Compounds 7 and 8 are low viscosity fluids which crystallize on standing. Compounds 6, 7 and 8 were hydrolyzed by the method described in Example 1. The hydrolyzate of compound 7 when heated condensed somewhat to produce a viscous fluid which had little flow at room temperature. The hydrolyzates of compounds 7 and 8 were relatively pure silanols. The silane diol from hydrolyzing compound 7 melted at 220° C. The melting point of this compound remained constant upon recrystallization. The silanol from compound 8 melts at an even higher temperature without condensing to the siloxane. This silanol is so stable that, when melted with toluene chlorosulfonic acid, the latter vaporizes from the molten mixture without in any way affecting the properties of the silanol.

Similarly the Grignard was prepared of compound 5 and reacted with an excess of silicon tetrachloride. The following silanes were produced:

|  | B. P., ° C. | $n_{D_{20}}$ |
|---|---|---|
| (9) 6 bis 1,4(trifluoromethyl) phenyl trichlorosilane | ca. 80 @ .25 mm | |
| (10) bis 6,6' [bis 1,4(trifluoromethyl) phenyl] dichlorosilane | 109.5–110 @ 3 mm | 1.4248 |
| (11) tris 6,6',6" [bis 1,4 (trifluoromethyl)phenyl] chlorosilane | 155 to 160 @ 3 mm | 1.4040 |

Compound 9 was similar to compound 6 in its physical and chemical properties. Compound 10 was a high viscosity fluid as contrasted with compound 7 which was of low viscosity. Furthermore, compound 10 did not crystallize on standing. Upon hydrolysis as above described the hydrolyzate was non-crystalline. Compound 11 was so viscous that it had virtually no flow at room temperature nor did it crystallize.

The hydrolyzates of compounds 6 to 11 may be added to polymeric dimethylsiloxanes. Upon heating in the presence of air, the mixture gradually thickens though at a much lower rate than the polymeric dimethylsiloxane to which none of these hydrolyzates have been added. After heating to the point that it gels, the gel so produced is characterized by its extreme toughness particularly as contrasted to the gel produced from the polymeric dimethyl silicone alone which latter gel is crumbly.

Analytical data in connection with the above compounds are not here given inasmuch as both the chlorides and the silanols are so stable and refractory even in the presence of fuming nitric and fuming sulphuric acids that they do not lend themselves readily to customary analytical methods. This, however, illustrates the outstanding stability of these materials.

*Example 3*

The Grignard reagent of trifluoromethylphenyl bromide was reacted with methylsilicon trichloride in the amount of one mol of the Grignard reagent per two mols of the silicon chloride. By the method described in Example 1, after separation of the salt, the reaction product was fractionated, and the following products were recovered:

|  | B. P., °C. | $D_{25}$ | $n_{D_{25}}$ |
|---|---|---|---|
| (12) $F_3CC_6H_4CH_3SiCl_2$ | 115.5 @ 50 mm | 1.3436 | 1.4639 |
| (13) $(F_3CC_6H_4)_2CH_3SiCl$ | 123 @ 4 mm | 1.3535 | 1.4841 |

Compound 12 was a low viscosity fluid. This chloride was dissolved in diethyl ether. Water in excess was added to the ethereal solution. The hydrolyzate was a low viscosity oil of 100 centistokes at room temperature which did not crystallize. While polymeric dimethyl silicone forms a gel when exposed to air at 250° C., for 18 hours, the hydrolyzate of compound 12 did not become solid until it had been held for 500 hours under these conditions. Even after the material had the appearance of being a solid, it had not gelled inasmuch as it was still soluble in acetone. Upon addition of concentrated sulphuric acid to the hydrolyzate, in amount such as is employed to effect the polymerization of dimethylsiloxane, no polymerization of the hydrolyzate was effected. Neither the chloride nor the hydrolyzate were decomposed by boiling fuming sulphuric or fuming nitric acid.

Compound 13 was a fluid of around 100 centistokes viscosity.

That which is claimed is:

1. 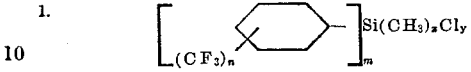

where $n$ is a positive integer less than three, $m$ and $y$ are positive integers less than four, $x$ is an integer from 0 to 2 inclusive, and $m+x+y=4$.

2. 

3. 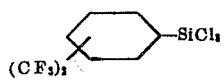

4. 

5. 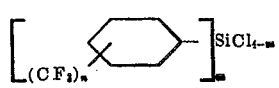

wherein $n$ is an integer from 1 to 2 and $m$ is an integer from 1 to 3.

CHARLES F. KOHL, JR.

References Cited in the file of this patent

UNITED STATES PATENTS

| Number | Name | Date |
|---|---|---|
| 2,258,219 | Rochow | Oct. 7, 1941 |
| 2,469,888 | Patnode | May 10, 1949 |

OTHER REFERENCES

Pink et al., Jour. Chem. Soc., (London), vol. 123 (1923), pp. 2830–37.

Basset et al., Jour. Soc. Chem. Ind., May 1948, vol. 67, pp. 177–79.